(12) United States Patent
Gao et al.

(10) Patent No.: US 9,419,875 B2
(45) Date of Patent: Aug. 16, 2016

(54) VIDEO QUALITY ASSESSMENT METHOD AND APPARATUS

(71) Applicant: Huawei Technologies Co., Ltd., Shenzhen (CN)

(72) Inventors: Shan Gao, Shenzhen (CN); Lina Sun, Shenzhen (CN); Qingpeng Xie, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 243 days.

(21) Appl. No.: 14/331,611

(22) Filed: Jul. 15, 2014

(65) Prior Publication Data

US 2014/0328198 A1 Nov. 6, 2014

Related U.S. Application Data

(63) Continuation of application No. PCT/CN2012/084058, filed on Nov. 5, 2012.

(30) Foreign Application Priority Data

Apr. 23, 2012 (CN) .......................... 2012 1 0121335

(51) Int. Cl.
*H04L 12/26* (2006.01)
*H04N 17/02* (2006.01)
*H04N 17/00* (2006.01)

(52) U.S. Cl.
CPC ............ *H04L 43/0835* (2013.01); *H04N 17/00* (2013.01); *H04N 17/02* (2013.01)

(58) Field of Classification Search
CPC .. H04L 43/08; H04L 43/0823; H04L 43/0835
See application file for complete search history.

(56) References Cited

U.S. PATENT DOCUMENTS 6,091,777 A * 7/2000 Guetz .................. H04N 19/172
 375/240.03
6,741,569 B1 * 5/2004 Clark ...................... G10L 25/69
 370/252

(Continued)

FOREIGN PATENT DOCUMENTS

CN 101635846 A 1/2010
CN 101790107 A 7/2010

(Continued)

OTHER PUBLICATIONS

Partial English Translation and Abstract of Chinese Patent Application No. CN101790107A, Aug. 28, 2014, 5 pages.

(Continued)

*Primary Examiner* — Jenee Williams
(74) *Attorney, Agent, or Firm* — Conley Rose, P.C.; Grant Rodolph; Nicholas K. Beaulieu

(57) ABSTRACT

A video quality assessment method and a video quality assessment apparatus are provided. The method includes: acquiring parameter information of video data, where the parameter information includes a bit rate, a frame rate, and packet information; performing calculation according to the bit rate or the frame rate to obtain benchmark video quality of the video data; calculating the number of successively lost packets according to the packet information, and calculating the number of effective packet loss times; performing calculation according to the number of effective packet loss times to obtain video packet loss and distortion quality of the video data; and performing calculation according to the benchmark video quality and the video packet loss and distortion quality to obtain final video quality. Using the number of effective packet loss times can accurately assess videos more effectively and reduce algorithm complexity.

19 Claims, 9 Drawing Sheets

(56) References Cited

U.S. PATENT DOCUMENTS

| | | | | |
|---|---|---|---|---|
| 6,804,244 | B1* | 10/2004 | Anandakumar | H04L 1/0001 370/328 |
| 7,827,584 | B2* | 11/2010 | Jiang | H04L 47/10 725/116 |
| 7,953,069 | B2* | 5/2011 | Connor | H04L 12/2602 370/250 |
| 8,254,469 | B2* | 8/2012 | Au | H04N 19/61 375/240.27 |
| 8,270,307 | B2* | 9/2012 | Friel | H04L 1/0009 370/242 |
| 2002/0010938 | A1* | 1/2002 | Zhang | H04L 47/263 725/95 |
| 2003/0099298 | A1* | 5/2003 | Rose | H04N 21/234 375/240.27 |
| 2003/0229840 | A1* | 12/2003 | Pattavina | H03M 13/2912 714/776 |
| 2004/0120345 | A1* | 6/2004 | Yamaguchi | H04L 1/1854 370/465 |
| 2007/0053303 | A1 | 3/2007 | Kryuchkov | |
| 2008/0052394 | A1* | 2/2008 | Bugenhagen | H04L 12/14 709/224 |
| 2008/0052401 | A1* | 2/2008 | Bugenhagen | H04L 12/14 709/227 |
| 2008/0291842 | A1 | 11/2008 | Isambart et al. | |
| 2009/0041114 | A1 | 2/2009 | Clark | |
| 2010/0005186 | A1* | 1/2010 | Yamada | G10L 25/69 709/231 |
| 2010/0008241 | A1 | 1/2010 | Gustafsson et al. | |
| 2010/0027464 | A1* | 2/2010 | Luo | H04L 1/0003 370/328 |
| 2010/0046634 | A1* | 2/2010 | Dai | H04N 21/23418 375/240.25 |
| 2010/0103822 | A1* | 4/2010 | Montwill | H04L 41/0645 370/242 |
| 2010/0284295 | A1 | 11/2010 | Yamagishi et al. | |
| 2011/0075852 | A1 | 3/2011 | Egi et al. | |
| 2011/0085605 | A1 | 4/2011 | Xie et al. | |
| 2012/0206610 | A1* | 8/2012 | Wang | H04N 17/004 348/184 |
| 2012/0212624 | A1 | 8/2012 | Yang et al. | |
| 2013/0259136 | A1* | 10/2013 | Liao | H04N 19/37 375/240.24 |
| 2014/0232878 | A1 | 8/2014 | Sun et al. | |

FOREIGN PATENT DOCUMENTS

| | | |
|---|---|---|
| CN | 101911714 A | 12/2010 |
| CN | 101998137 A | 3/2011 |
| CN | 102056004 A | 5/2011 |
| CN | 102057634 A | 5/2011 |
| EP | 2018069 A1 | 1/2009 |
| JP | 20070329773 A | 12/2007 |

OTHER PUBLICATIONS

Foreign Communication From A Counterpart Application, PCT Application No. PCT/CN2012/084058, English Translation of International Search Report dated Feb. 28, 2013, 3 pages.

Foreign Communication From A Counterpart Application, PCT Application No. PCT/CN2012/084058, English Translation of Written Opinion dated Feb. 28, 2013, 10 pages.

Winkler, S., et al., "The Evolution of Video Quality Measurement: From PSNR to Hybrid Metrics," IEEE Transactions on Broadcasting, vol. 54, No. 3, Sep. 2008, pp. 660-668.

Foreign Communication From A Counterpart Application, European Application No. 12875390.2, Extended European Search Report dated Nov. 11, 2014, 7 pages.

Foreign Communication From A Counterpart Application, Chinese Application No. 201210121335.X, Chinese Office Action dated Oct. 29, 2014, 6 pages.

Foreign Communication From A Counterpart Application, Chinese Application No. 201210121335.X, Chinese Search Report dated Oct. 20, 2014, 2 pages.

* cited by examiner

VIDEO QUALITY ASSESSMENT METHOD AND APPARATUS

CROSS-REFERENCE TO RELATED APPLICATIONS

This application is a continuation of International Application No. PCT/CN2012/084058, filed on Nov. 5, 2012, which claims priority to Chinese Patent Application No. 201210121335.X, filed on Apr. 23, 2012, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of communications technologies, and in particular, to a video quality assessment method and apparatus.

BACKGROUND

In a background in which network media develops quickly, services such as video on demand, Web television (TV), and video phone already become main services for a broadband network and a wireless network. Operators need to monitor quality of a transmitted video service and take corresponding measures in time to make adjustment to meet experience requirements of users for media services. Quality of network media is affected by many complex factors, including quality of service of a transmission channel (for example, bandwidth, packet loss, delay, and jitter) and matching between parameters of a media coding and decoding end and a transmission channel (for example, coding mode, resolution, error resilience strength, and whether a buffer control policy of a coding and decoding end is appropriate). In addition to packet loss on a channel, coding mode, and the like that cause loss of media data, resulting in degradation of subjective quality of media, channel delay and jitter cause media pause or frame freezing, which also severely affects the subjective quality of media. Therefore, to obtain an accurate model quality score, it is of crucial importance to accurately calculate compression distortion and compression quality that complies with a human eye visual system. It is thus clear that network video quality assessment is an indispensable important technology in network video applications. However, subjective quality assessment by means of observation using human eyes in person is time-consuming and demanding and is obviously infeasible for network video applications.

According to the degree of need for original reference videos, objective video quality assessment methods are classified into three categories: fully referenced, partly referenced, and non-referenced objective video quality assessment. Due to limitation on channel bandwidth, a video receiving end usually cannot obtain a required reference video sequence. Therefore, the non-referenced video quality assessment method needs to be used to assess video streams transmitted in a network.

During application of actual products, algorithm complexity is an issue that needs to be taken into consideration. Real-time monitoring and rating for video data need to be supported on terminal devices with lower computing capabilities (network devices and test devices). Therefore, deep resolution of video streams may not be provided, for example, a specific motion vector (MV) or pixel value cannot be resolved. Another issue that needs to be taken into consideration is that, when a video is encrypted, video content information cannot be acquired. In the prior art, when frame boundary information is not used, calculation by using a packet loss ratio cannot really reflect the degree of video distortion. In addition, usage conditions of an algorithm are limited by many aspects.

SUMMARY

Embodiments of the present invention provide a video quality assessment method and apparatus that can reflect distortion of video data to some extent when frame boundary information is not used.

An embodiment of the present invention discloses a video quality assessment method, including: acquiring parameter information of video data, where the parameter information includes a bit rate, a frame rate, and packet information; performing calculation according to the bite rate or the frame rate to obtain benchmark video quality of the video data; calculating the number of successively lost packets according to the packet information, and calculating the number of effective packet loss times according to the number of successively lost packets and a first packet threshold; performing calculation according to the number of effective packet loss times to obtain video packet loss and distortion quality of the video data; and performing calculation according to the benchmark video quality and the video packet loss and distortion quality to obtain final video quality.

An embodiment of the present invention discloses a video quality assessment apparatus, including: an acquiring module configured to acquire parameter information of video data, where the parameter information includes a bit rate, a frame rate, and packet information; a benchmark quality generating module configured to perform calculation according to the bit rate or the frame rate obtained by the acquiring module to obtain benchmark video quality of the video data; an effective packet loss times generating module configured to calculate the number of successively lost packets according to the packet information, and calculate the number of effective packet loss times according to the number of successively lost packets and a first packet threshold; a packet loss and distortion quality generating module configured to perform calculation according to the number of effective packet loss times obtained by the effective packet loss times generating module to obtain video packet loss and distortion quality of the video data; and a final quality generating module configured to perform calculation according to the benchmark video quality obtained by the benchmark quality generating module and the video packet loss and distortion quality obtained by the packet loss and distortion quality generating module to obtain final video quality.

An embodiment of the present invention further discloses a video quality assessment method, including: acquiring parameter information of video data, where the parameter information includes a bit rate, a frame rate, and packet information; performing calculation according to the bite rate or the frame rate to obtain benchmark video quality of the video data; calculating the number of correctly received packets between two successive packet losses according to the packet information, and calculating the number of effective packet loss times according to the number of correctly received packets and a second packet threshold; performing calculation according to the number of effective packet loss times to obtain video packet loss and distortion quality of the video data; and performing calculation according to the benchmark video quality and the video packet loss and distortion quality to obtain final video quality.

An embodiment of the present invention further discloses a video quality assessment apparatus, including: a video parameter collecting module configured to acquire parameter information of video data, where the parameter information includes a bit rate, a frame rate, and packet information; a benchmark video quality acquiring module configured to perform calculation according to the bit rate or the frame rate obtained by the video parameter collecting module to obtain benchmark video quality of the video data; an effective packet loss times acquiring module configured to calculate the number of correctly received packets between two successive packet losses according to the packet information obtained by the video parameter collecting module, and calculate the number of effective packet loss times according to the number of correctly received packets and a second packet threshold; a packet loss and distortion quality acquiring module configured to perform calculation according to the number of effective packet loss times obtained by the effective packet loss times acquiring module to obtain video packet loss and distortion quality of the video data; and a final quality acquiring module configured to perform calculation according to the benchmark video quality obtained by the benchmark video quality acquiring module and the video packet loss and distortion quality obtained by the packet loss and distortion quality acquiring module to obtain final video quality.

According to the video quality assessment method and apparatus according to the embodiments of the present invention, parameter information of video data is acquired, where the parameter information includes a bit rate, a frame rate, and packet information; benchmark video quality of the video data is obtained through calculation according to the bit rate or the frame rate or both; the number of successively lost packets is calculated according to the packet information; the number of effective packet loss times is calculated according to the number of successively lost packets and a first packet threshold; video packet loss and distortion quality is obtained through calculation according to the number of packet losses; and final video quality is obtained through calculation according to the benchmark video quality and the video packet loss and distortion quality. Received packets are processed according to input parameter information of video data, for example, resolution, a bit rate, and a frame rate. This effectively reflects distortion of video data when frame boundary information is not used.

BRIEF DESCRIPTION OF THE DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

When frame boundary information is not used, at present, an existing algorithm performs calculation by using a packet loss ratio. However, the packet loss ratio cannot reflect real distortion of videos. For example, when two successive packets or two close packets are lost at the same time, a damage degree of video frames is the same from the subjective angle, but the damage degree of video frames reflected by the packet loss ratio is more severe and does not match feelings in the subjective angle. Tests show that the number of effective packet loss times may be used to effectively reflect actual distortion of videos and effectively assess video quality.

In a packet loss condition, a current algorithm usually performs calculation by using the packet loss ratio, that is, a ratio of the number of lost packets in a period of time to the total number of packets that should actually be received.

An embodiment of the present invention performs calculation by using the number of effective packet loss times, that is, the number of packet losses happen in a period of time. Packet loss refers to loss of packets in a data transmission process. An accidental packet loss in data transmission may be loss of one packet or may be loss of multiple packets. A method for counting the number of packet losses adopts a processing method similar to clustering, that is, when an interval between two packet losses is greater than preset N correctly received packets, 1 is added; when an interval between two packet losses is not greater than preset N correctly received packets, calculation is performed according to the number of correctly received packets between a current packet loss and a previous packet loss. The following gives an example of calculation by using the packet loss ratio and the number of effective packet loss times.

Figure 1:
FIG. 1 is a schematic diagram for calculating a packet loss ratio and the number of effective packet loss times according to an embodiment of the present invention.

As shown in FIG. 1, black boxes indicate packets that are correctly received and white boxes indicate packets that are lost in a data transmission process. In a period between two packet losses, two packets are correctly received.

Packet loss ratio=2/15=0.133=13.3%

Number of packet loss events=1+2/N=1.2 (N=10)

Where, N is a preset number of packets that are successively and correctly received. In the example, the value of N is set to 10.

Figure 2:
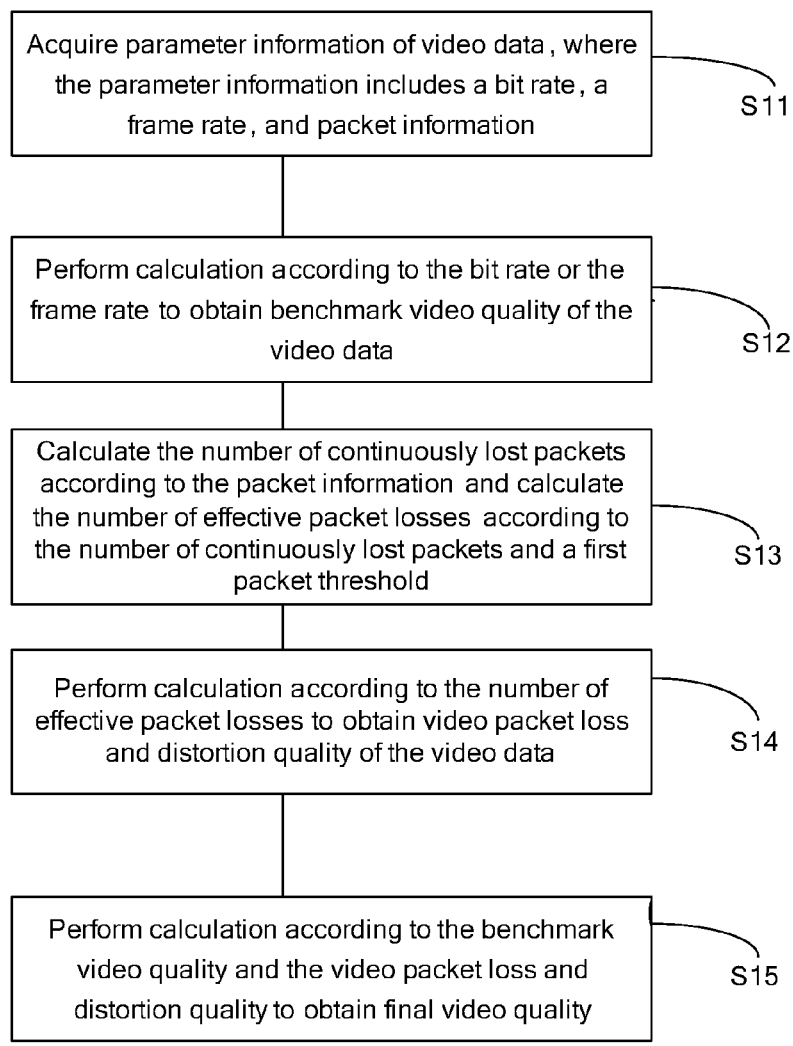
FIG. 2 is a flowchart of a video quality assessment method according to an embodiment of the present invention.

As shown in FIG. 2, an embodiment of the present invention provides a video quality assessment method, including:

S11. Acquire parameter information of video data, where the parameter information includes a bit rate, a frame rate, and packet information.

S12. Perform calculation according to the bite rate or the frame rate to obtain benchmark video quality of the video data.

S13. Calculate the number of successively lost packets according to the packet information, and calculate the number of effective packet loss times according to the number of successively lost packets and a first packet threshold.

S14. Perform calculation according to the number of effective packet loss times to obtain video packet loss and distortion quality of the video data.

S15. Perform calculation according to the benchmark video quality and the video packet loss and distortion quality to obtain final video quality.

According to the video quality assessment method provided in the embodiment of the present invention, received packets are processed according to input parameter information of video data, for example, resolution, a bit rate, and frame rate. This effectively reflects video data distortion and accurately assesses video quality when frame boundary is not used.

Figure 3:
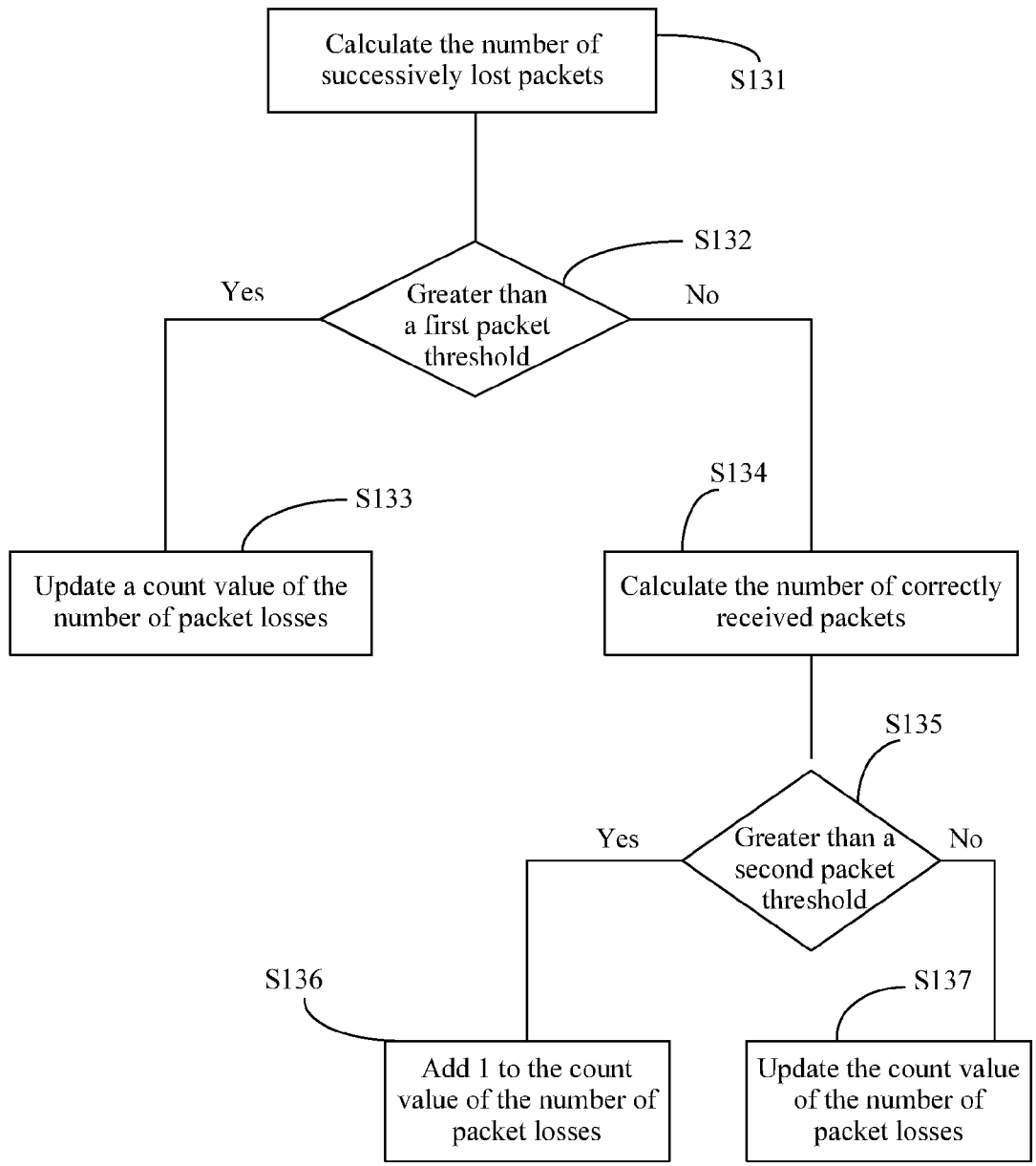
FIG. 3 is a flowchart for calculating the number of effective packet loss times according to an embodiment of the present invention.

As shown in FIG. 3, an embodiment of the present invention provides a video quality assessment method, including:

S131. Calculate the number of successively lost packets.

Determine, according to data information of a packet header included in the packet information, whether packet loss occurs and the number of successively lost packets.

S132. Determine whether the number of successively lost packets is greater than a first packet threshold.

Compare the number of successively lost packets obtained in step S131 with the first packet threshold. When the number of successively lost packets is greater than the first packet threshold, go to step S133 for subsequent calculation. When the number of successively lost packets is not greater than the first packet threshold, go to step S134 for subsequent calculation. The first packet threshold is used for determination with the number of successively lost packets.

In an embodiment of the present invention, under a certain resolution, the value of the first packet threshold relates to a bit rate or frame rate. When the frame rate is fixed, if the bit rate is higher, the first packet threshold is greater. When the coding bit rate is fixed, if the coding frame rate is lower, the first packet threshold is greater.

S133. Update a count value of the number of packet losses.

Update the count value of the number of packet losses according to the number of successively lost packets and the first packet threshold.

In an embodiment of the present invention, determine, according to parameter information of video data, whether the first packet loss occurs, and, if the first packet loss occurs, set the count value of the number of packet losses to 1; if the first packet loss does not occur, go to step S134.

S134. Calculate the number of correctly received packets.

Calculate the number of correctly received packets between two packet loss events according to packet information of video data.

S135. Determine whether the number of correctly received packets is greater than a second packet threshold.

Compare the number of correctly received packets obtained through calculation in step S134 with the second packet threshold. When the number of correctly received packets is greater than the second packet threshold, go to step S136; when the number of successively lost packets is not greater than the first packet threshold, go to step S137 for subsequent calculation.

In an embodiment of the present invention, the second packet threshold is used to compare with the number of successively and correctly received packets for determination. The threshold relates to a resolution, a bit rate, and a frame rate. When the frame rate is fixed, if the coding bit rate is higher, the second packet threshold is greater. When the coding bit rate is fixed, if the coding frame rate is lower, the second packet threshold is greater. In an embodiment of the present invention, the second packet threshold may be initiatively set or may also be read by accessing a second packet threshold table.

S136. Add 1 to the count value of the number of packet losses.

Add 1 to the count value of the number of packet losses.

S137. Update the count value of the number of packet losses.

Update the count value of the number of packet losses according to the number of correctly received packets and the second packet threshold. Repeat the foregoing steps until the to-be-assessed video data is processed completely, where the count value of the number of packet losses is the number of effective packet loss times.

In an embodiment of the present invention, whether the to-be-assessed video data is completely processed is determined according to a sequence number or timestamp information of a received packet header.

According to the video quality assessment method provided in the embodiment of the present invention, received packets are processed according to input parameter information of video data, for example, resolution, a bit rate, and a frame rate. This effectively reflects video data distortion and accurately assesses video quality when frame boundary information is not used.

Figure 4:
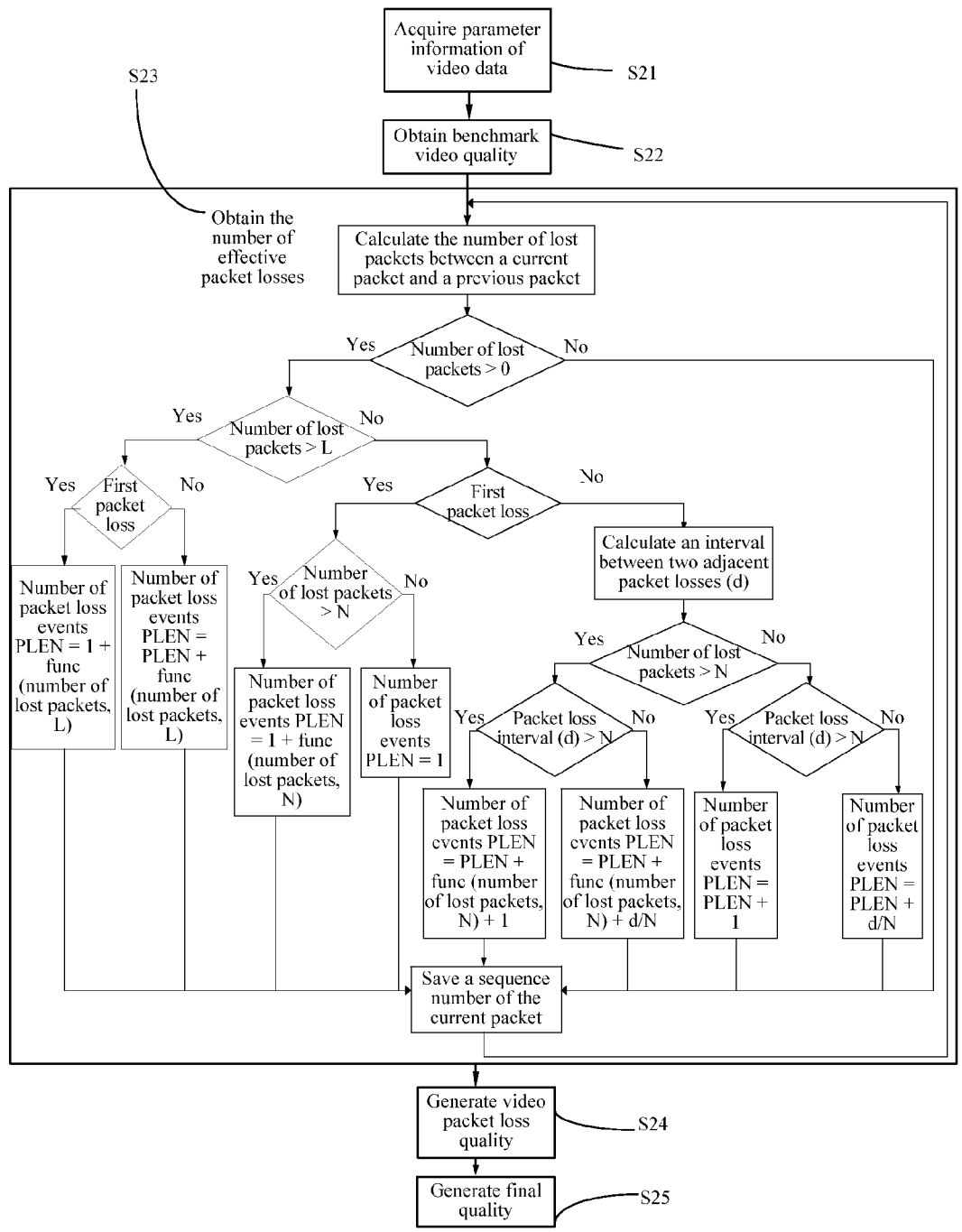
FIG. 4 is a flowchart for calculating the number of effective packet loss times according to a specific embodiment of the present invention.

The following details a specific example of a video quality assessment method according to the embodiment of the present invention with reference to FIG. 4.

S21. Acquire parameter information of video data.

Acquire parameter information of video data, where the parameter information of video data includes a bit rate, a frame rate, and packet information.

In an embodiment of the present invention, the parameter information to be acquired further includes at least one of a video data coding type, video resolution, an Internet Protocol (IP) packet size, and video content information. Benchmark video quality of video data can be calculated more accurately according to the parameter information.

In an embodiment of the present invention, the packet information includes at least one of real-time transport protocol (RTP) packet information and transport stream (TS) packet information.

S22. Obtain benchmark video quality.

Perform calculation according to the bit rate or the frame rate obtained in S21 to obtain benchmark video quality of video data. The benchmark video quality is video quality obtained after video code is compressed and is basic quality when different video stream codes have different bit rates and frame rates under different coding types.

In an embodiment of the present invention, the following formula is used to calculate the benchmark video quality of the video data:

$$Q_{encoding} = \text{Max}_{mos} - A \cdot \frac{1}{func(Fr, Br)}.$$

Where, $Q_{encoding}$ indicates benchmark video quality, $\text{Max}_{mos}$ indicates the highest video quality, A indicates a fluctuation range of video quality, that is, a difference between the highest video quality and the lowest video quality, Br indicates a video coding bit rate, and Fr indicates a video coding frame rate.

In an embodiment of the present invention, if content complexity is already known, the following formula may be used to calculate the benchmark video quality:

$$Q_{encoding} = \text{Max}_{mos} - A \cdot \frac{func(tcc)}{func(Fr, Br)}.$$

Where, $Q_{encoding}$ indicates benchmark video quality, A indicates a fluctuation range of video quality, that is, a difference between the highest video quality and the lowest video quality, Br indicates a video coding bit rate, Fr indicates a video coding frame rate, $\text{Max}_{mos}$ indicates the highest video quality, and tcc indicates content complexity. The content complexity indicates description of video content complexity in time and space or in comprehensive time and space, for example, if a video sequence moves faster or has more content details or richer colors, a video complexity description factor is larger.

It may be understood that the formula is just an example used to help understand the embodiment of the present invention rather than a limitation to the embodiment of the present invention.

S23. Calculate the number of effective packet loss times.

Determine, according to data information of a packet header included in the packet information, whether packet loss occurs and the number of successively lost packets.

After determining that packet loss occurs, compare the number of successively lost packets with a first packet threshold.

In an embodiment of the present invention, under a certain resolution, the value of the first packet threshold relates to a bit rate or frame rate of video data. When the frame rate is fixed, if the coding bit rate is higher, the first packet threshold is greater. When the coding bit rate is fixed, if the coding frame rate is lower, the first packet threshold is greater.

In an embodiment of the present invention, for example, the following formula may be used to calculate the first packet threshold:

$$L = d \cdot func(Br, Fr) + e.$$

Where, L indicates the first packet threshold, Br indicates the coding bit rate, Fr indicates the coding frame rate, and d and e are constants. The formula may be linear, non-linear, or a combination of linear and non-linear.

When the number of successively lost packets is greater than the first packet threshold, optionally, determine whether the first packet loss of video data occurs. If the first packet loss occurs, the following formula is used to update the count value of the number of packet losses:

$$PLEN = 1 + func(A, L).$$

Where, PLEN indicates the count value of the number of packet losses, A indicates the number of successively lost packets, and L indicates the first packet threshold.

In an embodiment of the present invention, the following formula is used to update the count value of the number of packet losses:

$$PLEN = PLEN + func(A, L).$$

Where, PLEN indicates the count value of the number of packet losses, A indicates the number of successively lost packets, and L indicates the first packet threshold.

In an embodiment of the present invention, the count value of the number of packet losses may also be updated by using a packet loss ratio:

$$PLEN = PLEN + func(C).$$

Where, PLEN indicates the count value of the number of packet losses and C indicates a packet loss ratio of video data. The packet loss ratio refers to a ratio of lost packets to packets that should be received in a data transmission process.

In an embodiment of the present invention, the number of correctly received packets between two packet loss events is calculated according to packet information of video data, and then the number of correctly received packets obtained through calculation is compared with the number successively lost packets and the second packet threshold separately.

In an embodiment of the present invention, the second packet threshold is used for determination with the number of successively and correctly received packets. The threshold relates to a resolution, a bit rate, and a frame rate. When the resolution is fixed, if the coding bit rate is higher, the second packet threshold is greater. When the coding bit rate is fixed, if the coding frame rate is lower, the second packet threshold is greater.

In an embodiment of the present invention, the second packet threshold may be initiatively set or may also be read by accessing a second packet threshold table.

In an embodiment of the present invention, for example, the following formula may be used to calculate the second packet threshold:

$$N = a \cdot func(Br, Fr) + b.$$

Where, N indicates the second packet threshold, and a and b are constants and may be set according to different resolution or bit rates. Br indicates a coding bit rate of a received video and Fr indicates a coding frame rate of a received video. The formula may be linear, non-linear, or a combination of linear and non-linear.

It may be understood that the formula is just an example used to help understand the embodiment of the present invention rather than a limitation to the embodiment of the present invention.

In an embodiment of the present invention, a condition that the first packet loss occurs to video data to be assessed is further included.

When the number of successively lost packets is greater than the second packet threshold, the following formula is used to update the count value of the number of packet losses:

$$PLEN = 1 + func(A, N).$$

Where, PLEN indicates the count value of the number of packet losses, A indicates the number of successively lost packets, and N indicates the second packet threshold.

When the number of successively lost packets is not greater than the second packet threshold, the count value of the number of packet losses is set to 1.

In an embodiment of the present invention, when the number of successively lost packets is not greater than the second packet threshold:

When the number of correctly received packets is greater than the second packet threshold, 1 is added to the count value of the number of packet losses.

In an embodiment of the present invention, the following formula is used for calculation:

$$PLEN=PLEN+1.$$

Where, PLEN indicates the count value of the number of packet losses.

When the number of correctly received packets is not greater than the second packet threshold, the count value of the number of packet losses is updated according to the number of correctly received packets and the second packet threshold.

In an embodiment of the present invention, the following formula is used to update the count value of the number of packet losses:

$$PLEN = PLEN + \frac{d}{N}.$$

Where, PLEN indicates the count value of the number of packet losses, d indicates the number of correctly received packets, and N indicates the second packet threshold.

In an embodiment of the present invention, when the number of successively lost packets is greater than the second packet threshold:

When the number of correctly received packets is greater than the second packet threshold, the count value of the number of packet losses is updated according to the number of successively lost packets and the second packet threshold.

In an embodiment of the present invention, the following formula is used to update the count value of the number of packet losses:

$$PLEN=PLEN+\text{func}(A,N)+1.$$

Where, PLEN indicates the count value of the number of packet losses, A indicates the number of successively lost packets, and N indicates the second packet threshold.

When the number of correctly received packets is not greater than the second packet threshold, the count value of the number of packet losses is updated according to the number of successively lost packets, the number of correctly received packets, and the second packet threshold:

$$PLEN = PLEN + \text{func}(A, N) + \frac{d}{N}.$$

Where, PLEN indicates the count value of the number of packet losses, A indicates the number of successively lost packets, N indicates the second packet threshold, and d indicates the number of correctly received packets.

The following details a specific example for calculating the number of effective packet loss times with reference to FIG. 4.

As shown in FIG. 4, L indicates the first packet threshold, N indicates the second packet threshold, PLEN indicates the count value of the number of packet losses, and d indicates the number of correctly received packets at an interval between two packet losses.

When packet loss is detected, if trigger conditions of the step are met, calculation starts.

In an embodiment of the present invention, the first packet threshold L is set to 100 and the second packet threshold N is set to 6. The number of successively lost packets for the first time is 4, the number of successively lost packets for the second time is 5, and the number of correctly received packets d at an interval between packet losses of the first time and the second time is 3.

The number of successively lost packets for the first time is smaller than L. When it is determined that the first packet loss occurs, the number of successively lost packets is compared with N. Because the number of successively lost packets for the first time is smaller than the second packet threshold N, the count value of the number of packet losses PLEN is set to 1. When the second packet loss occurs, the number of lost packets is still smaller than L. Then, d is calculated. Because the number of the second lost packets is smaller than N and d is smaller than N, the count value of the number of packet losses is updated as follows: PLEN=1+3/6=1.5.

S24. Generate video packet loss and distortion quality.

Calculate video packet loss and distortion quality of video data according to the number of effective packet loss times obtained through calculation in step S23.

In an embodiment of the present invention, the following formula is used to calculate the video packet loss and distortion quality:

$$Q_{pkt\_lost} = (Q_{encoding} - MOS_{min}) \cdot \left(1 - \frac{1}{1+\left(\frac{PLEN}{a_1}\right)^{b_1}}\right).$$

Where, PLEN indicates the number of effective packet loss times, ($Q_{encoding}$–$MOS_{min}$) indicates the maximum distortion degree for packet loss, $MOS_{min}$ indicates the lowest video quality, $Q_{encoding}$ indicates benchmark video quality, and $a_1$ and $b_1$ are constants.

It may be understood that the formula is just an example used to help understand the embodiment of the present invention rather than a limitation to the embodiment of the present invention.

S25. Generate final video quality.

Perform calculation according to the benchmark video quality obtained in step S22 and the video packet loss and distortion quality obtained in step S24 to obtain final video quality of video data.

In an embodiment of the present invention, the following formula is used to calculate final video quality of video data:

$$Q_v=Q_{encoding}-Q_{pkt\_lost}.$$

Where, $Q_v$ indicates final video quality, $Q_{encoding}$ indicates benchmark video quality, and $Q_{pkt\_lost}$ indicates video packet loss and distortion quality.

An embodiment of the present invention further includes: determining whether the number of effective packet loss times obtained through calculation in step S23 is greater than a preset third threshold and, when the number of effective packet loss times is greater than the preset third threshold, directly determining a preset level to be the final video quality. A setting of the preset third threshold relates to statistics experience and the third threshold may be set according to subjective experience of a handler.

Compared with a video quality assessment method that uses only packet loss ratio, the video quality assessment method according to the embodiment of the present invention can accurately reflect a degree of damage of video frames, make assessment more accurate, and make algorithm complexity lower and can be easily used on various terminals.

Figure 5:
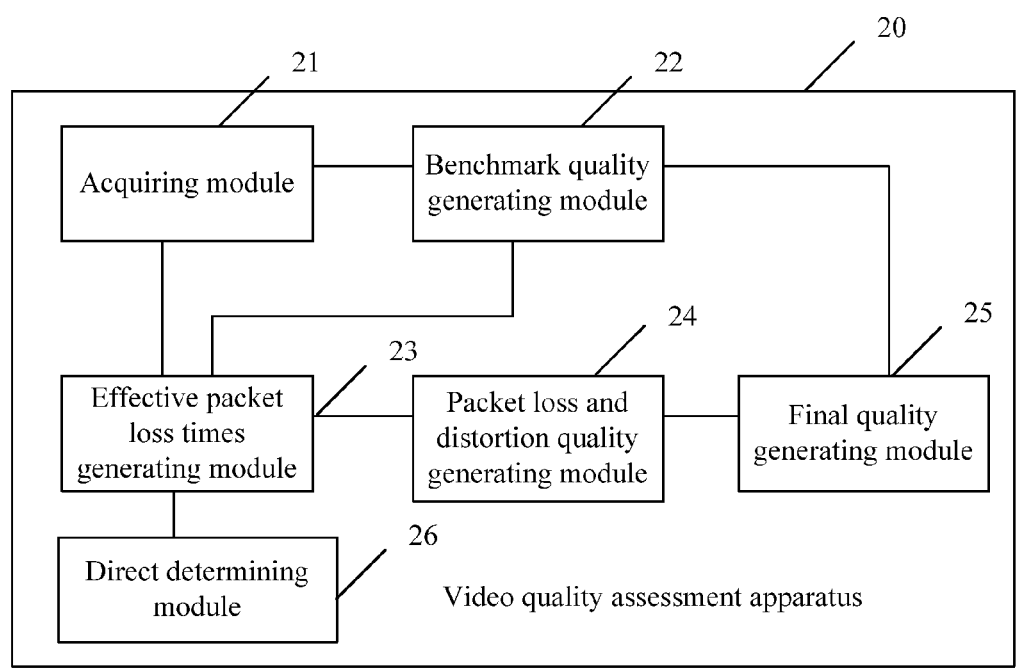
FIG. 5 is a schematic structural diagram of a video quality assessment apparatus according to an embodiment of the present invention.
Figure 6:
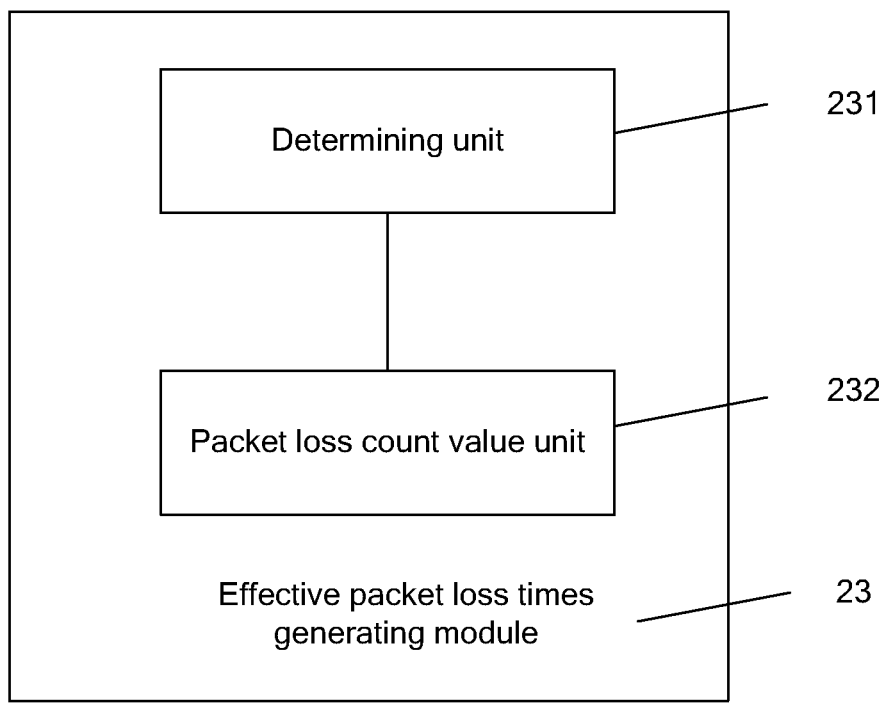
FIG. 6 is a schematic structural diagram of an effective packet loss times generating module according to the embodiment of the present invention shown in FIG. 5.

The embodiment of the present invention provides a video quality assessment apparatus. As shown in FIG. 5, a video quality assessment apparatus 20 according to the embodiment of the present invention includes an acquiring module 21, a benchmark quality generating module 22, an effective packet loss times generating module 23, a packet loss and distortion quality generating module 24, and a final quality generating module 25.

The acquiring module 21 is configured to acquire parameter information of video data, where the parameter information includes a bit rate, a frame rate, and packet information; the benchmark quality generating module 22 is configured to perform calculation according to the bit rate or the frame rate acquired by the acquiring module 21 to obtain benchmark video quality of the video data; the effective packet loss times generating module 23 is configured to calculate the number of successively lost packets according to the packet information acquired by the acquiring module 21, and calculate the number of effective packet loss times according to the number of successively lost packets and a first packet threshold; the packet loss and distortion quality generating module 24 is configured to perform calculation according to the number of effective packet loss times acquired by the effective packet loss times generating module 23 to obtain video packet loss and distortion quality of the video data; and the final quality generating module 25 is configured to perform calculation according to the benchmark video quality acquired by the benchmark quality generating module 22 and the video packet loss and distortion quality acquired by the packet loss and distortion generating module 24 to obtain final video quality.

The video quality assessment apparatus 20 according to the embodiment of the present invention can accurately reflect a degree of damage of video frames, make assessment more accurate, and makes algorithm complexity lower and can be easily used on various terminals.

In an embodiment of the present invention, the parameter information to be acquired by the acquiring module 21 further includes at least one of a coding type, video resolution, an IP packet size, and video content information.

In an embodiment of the present invention, the packet information includes at least one of RTP packet information and TS packet information.

In an embodiment of the present invention, the effective packet loss times generating module 23 includes: a determining unit 231 configured to determine whether the number of successively lost packets is greater than the first packet threshold; and a packet loss times count value unit 232, where when the number of successively lost packets is greater than the first packet threshold, the packet loss times count value unit is configured to update the count value of the number of packet losses according to the number of successively lost packets and the first packet threshold.

Repeat the foregoing steps until the to-be-assessed video data is processed completely, where the count value of the number of packet losses is the number of effective packet loss times.

In an embodiment of the present invention, the packet loss times count value unit 232 is further configured to, when the number of successively lost packets is not greater than the first packet threshold, update the count value of the number of packet losses according to the number of successively lost packets.

In an embodiment of the present invention, the first packet threshold is set according to the bit rate or the frame rate.

In an embodiment of the present invention, the packet loss times count value unit 232 is further configured to: calculate the number of correctly received packets between two packet losses according to the packet information; when the number of successively lost packets is not greater than a second packet threshold, when the number of correctly received packets is greater than the second packet threshold, add 1 to the count value of the number of packet losses; and when the number of correctly received packets is not greater than the second packet threshold, update the count value of the number of packet losses according to the number of correctly received packets and the second packet threshold.

In an embodiment of the present invention, the packet loss times count value unit 232 is further configured to: calculate the number of correctly received packets between two packet losses according to the packet information; when the number of successively lost packets is greater than the second packet threshold, when the number of correctly received packets is greater than the second packet threshold, update the count value of the number of packet losses according to the number of successively lost packets and the second packet threshold; and when the number of correctly received packets is not greater than the second packet threshold, update the count value of the number of packet losses according to the number of successively lost packets, the number of correctly received packets, and the second packet threshold.

In an embodiment of the present invention, the video quality assessment apparatus 20 further includes a direct determining module 26. When the number of effective packet loss times of the video data is greater than a preset third threshold, the direct determining module 26 directly determines a preset level to be the final video quality, where the number of effective packet loss times is obtained by the effective packet loss times generating module 23. A setting of the preset third threshold relates to statistics experience and the third threshold may be set according to subjective experience of a handler.

The video quality assessment apparatus 20 according to the embodiment of the present invention can accurately reflect a degree of damage of video frames, make assessment more accurate, and make algorithm complexity lower and can be easily used on various terminals.

Figure 7:
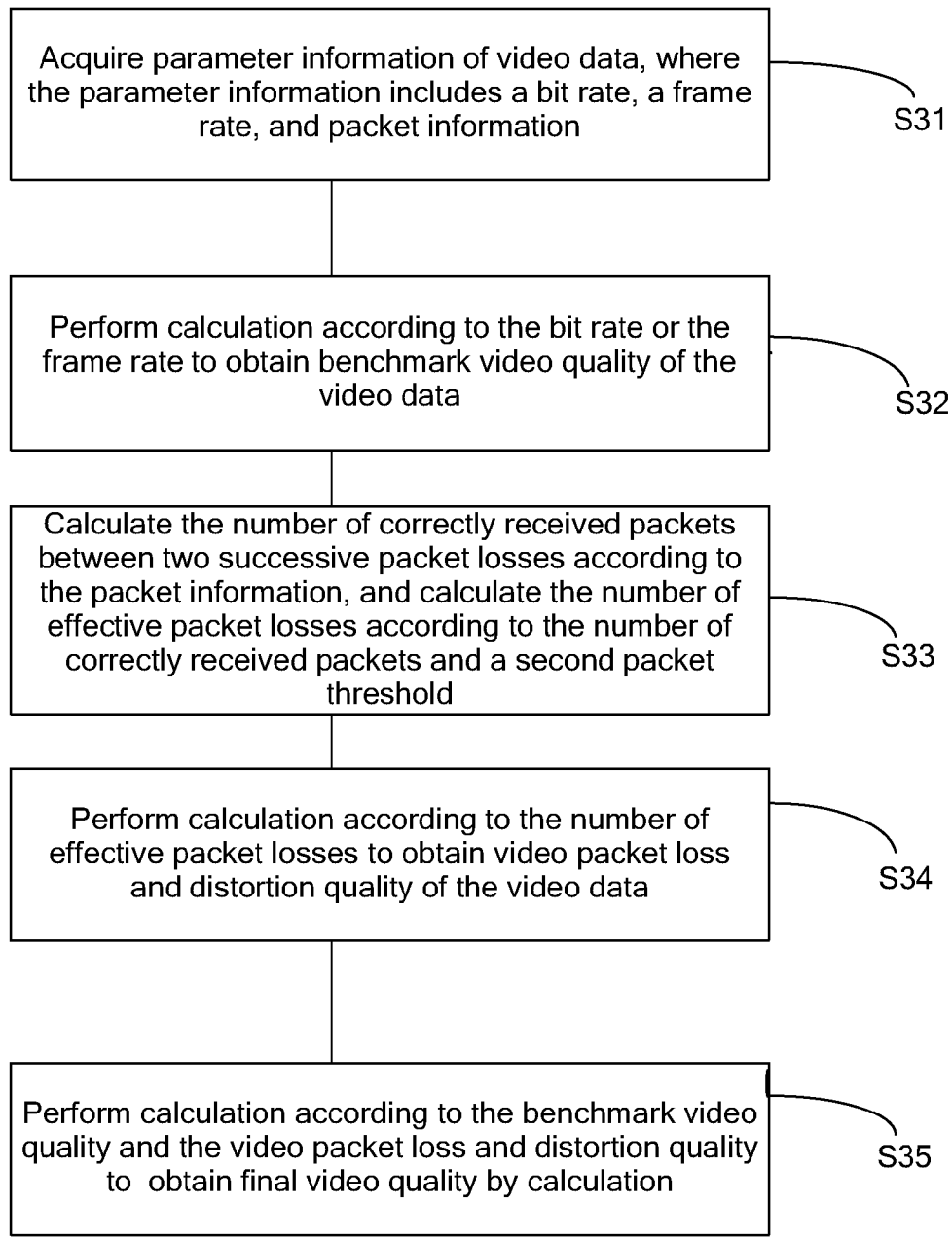
FIG. 7 is a flowchart of a video quality assessment method according to another embodiment of the present invention.

As shown in FIG. 7, an embodiment of the present invention provides a video quality assessment method, including:

S31. Acquire parameter information of video data, where the parameter information includes a bit rate, a frame rate, and packet information.

S32. Perform calculation according to the bite rate or frame rate to obtain benchmark video quality of the video data.

S33. Calculate the number of correctly received packets between two successive packet losses according to the packet information, and calculate the number of effective packet loss times according to the number of correctly received packets and a second packet threshold.

S34. Perform calculation according to the number of effective packet loss times to obtain video packet loss and distortion quality of the video data.

S35. Perform calculation according to the benchmark video quality and the video packet loss and distortion quality to obtain final video quality.

According to the video quality assessment method provided in the embodiment of the present invention, received packets are processed according to input parameter information of video data, for example, resolution, a bit rate, and a rate frame. This effectively reflects video data distortion and accurately assesses video quality when frame boundary is not used.

Figure 8:
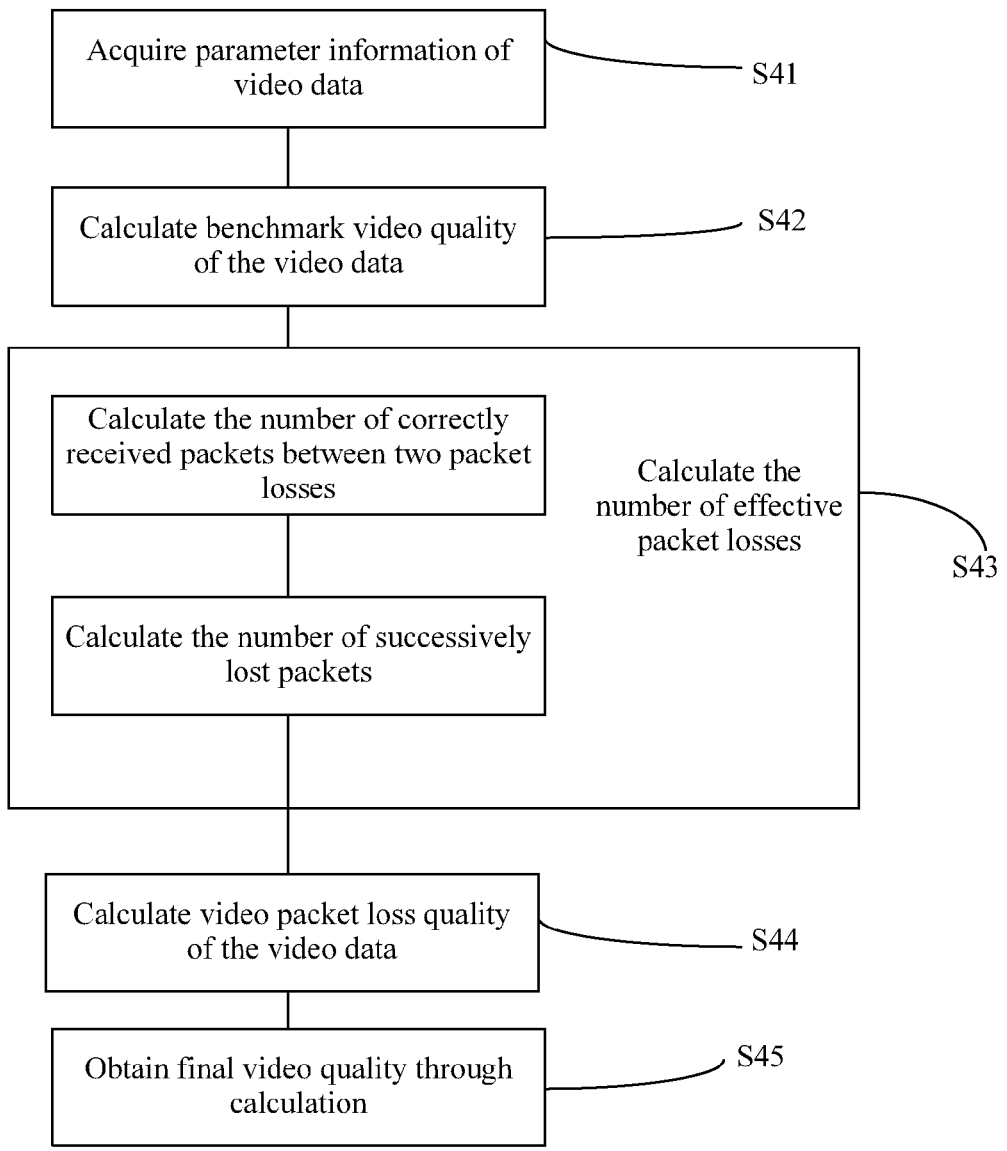
FIG. 8 is a flowchart of a video quality assessment method according to the embodiment of the present invention shown in FIG. 7.

The following details a video quality assessment method according to the embodiment of the present invention with reference to FIG. 8. As shown in FIG. 8, an embodiment of the present invention provides a video quality assessment method, including:

S41. Acquire parameter information of video data.

Acquire parameter information of video data, where the parameter information of video data includes a bit rate, a frame rate, and packet information.

In an embodiment of the present invention, the parameter information to be acquired also includes at least one of a video data coding type, video resolution, an IP packet size, and video content information. According to the parameter information, benchmark video quality of video data can be calculated more accurately.

In an embodiment of the present invention, packet information includes at least one of RTP packet information and TS packet information.

S42. Calculate benchmark video quality of video data.

Perform calculation according to the bit rate or the frame rate obtained in S41 to obtain benchmark video quality of video data. The benchmark video quality is video quality obtained after video code is compressed and is basic quality when different video stream codes have different bit rates and frame rates under different coding types.

In an embodiment of the present invention, the following formula is used to calculate the benchmark video quality of video data:

$$Q_{encoding} = \text{Max}_{mos} - A \cdot \frac{1}{\text{func}(Fr, Br)}.$$

Where, $Q_{encoding}$ indicates benchmark video quality, $\text{Max}_{mos}$ indicates the highest video quality, A indicates a fluctuation range of video quality, that is, a difference between the highest video quality and the lowest video quality, Br indicates a video coding bit rate, and Fr indicates a video coding frame rate.

In an embodiment of the present invention, if content complexity is already known, the following formula may be used to calculate the benchmark video quality:

$$Q_{encoding} = \text{Max}_{mos} - A \cdot \frac{\text{func}(tcc)}{\text{func}(Fr, Br)}.$$

Where, $Q_{encoding}$ indicates benchmark video quality, A indicates a fluctuation range of video quality, that is, a difference between the highest video quality and the lowest video quality, Br indicates a video coding bit rate, Fr indicates a video coding frame rate, $\text{Max}_{mos}$ indicates the highest video quality, and tcc indicates content complexity. Content complexity indicates description of video content complexity in time and space or in comprehensive time and space, for example, if a video sequence moves faster or has more content details or richer colors, a video complexity description factor is larger.

It may be understood that the formula is just an example used to help understand the embodiment of the present invention rather than a limitation to the embodiment of the present invention.

S43. Calculate the number of effective packet loss times.

Calculate the number of correctly received packets between two successive packet losses according to the packet information obtained in S41, and calculate the number of effective packet loss times according to the number of correctly received packets and the second packet threshold.

In an embodiment of the present invention, determine, according to data information of a packet header included in the packet information, whether packet loss occurs, and determine the number of correctly received packets between two packet losses according to the data information of the packet header included in the packet information.

In an embodiment of the present invention, the second packet threshold is used to compare with the number of successively and correctly received packets for determination. The threshold relates to a resolution, a bit rate, and a frame rate. When the frame rate is fixed, if the coding bit rate is higher, the second packet threshold is greater. When the coding bit rate is fixed, if the coding frame rate is lower, the second packet threshold is greater. In an embodiment of the present invention, the second packet threshold may be initiatively set or may also be read by accessing a second packet threshold table.

In an embodiment of the present invention, for example, the following formula may be used to calculate the second packet threshold:

$$N = a \cdot \text{func}(Br, Fr) + b.$$

Where, N indicates the second packet threshold, and a and b are constants and may be set according to different resolution or bit rates. Br indicates a coding bit rate of a received video and Fr indicates a coding frame rate of a received video. The formula may be linear, non-linear, or a combination of linear and non-linear.

It may be understood that the formula is just an example used to help understand the embodiment of the present invention rather than a limitation to the embodiment of the present invention.

When the number of correctly received packets is greater than the second packet threshold, 1 is added to a count value of the number of packet losses.

In an embodiment of the present invention, the following formula is used for calculation:

$$PLEN = PLEN + 1.$$

Where, PLEN indicates the count value of the number of packet losses.

When the number of correctly received packets is not greater than the second packet threshold, the count value of the number of packet losses is updated according to the number of correctly received packets and the second packet threshold.

In an embodiment of the present invention, the following formula is used to update the count value of the number of packet losses:

$$PLEN = PLEN + \frac{d}{N}.$$

Where, PLEN indicates the count value of the number of packet losses, d indicates the number of correctly received packets, and N indicates the second packet threshold.

Repeat the foregoing steps until the to-be-assessed video data is processed completely, where the count value of the number of packet losses is the number of effective packet loss times.

In an embodiment of the present invention, step S43 further includes: calculating the number of successively lost packets according to the packet information acquired in step S41, and update the count value of the number of packet losses according to the number of successively lost packets and a first packet threshold.

Determine, according to data information of a packet header included in the packet information, whether packet loss occurs and the number of successively lost packets.

After determining that packet loss occurs, compare the number of successively lost packets with the first packet threshold.

In an embodiment of the present invention, under a certain resolution, the value of the first packet threshold relates to a bit rate or a frame rate of video data. When the frame rate is fixed, if the coding bit rate is higher, the first packet threshold is greater. When the coding bit rate is fixed, if the coding frame rate is lower, the first packet threshold is greater.

In an embodiment of the present invention, for example, the following formula may be used to calculate the first packet threshold:

$$L = d \cdot \text{func}(Br, Fr) + e.$$

Where, L indicates the first packet threshold, Br indicates the coding bit rate, Fr indicates the coding frame rate, and d and e are constants. The formula and bit rate may be linear, non-linear, or a combination of linear and non-linear.

When the number of successively lost packets is greater than the first packet threshold, optionally, determine whether the first packet loss of video data occurs. If the first packet loss occurs, the following formula is used to update the count value of the number of packet losses:

$$PLEN = 1 + \text{func}(A, L).$$

Where, PLEN indicates the count value of the number of packet losses, A indicates the number of successively lost packets, and L indicates the first packet threshold.

In an embodiment of the present invention, the following formula is used to update the count value of the number of packet losses:

$$PLEN = PLEN + \text{func}(A, L).$$

Where, PLEN indicates the count value of the number of packet losses, A indicates the number of successively lost packets, and L indicates the first packet threshold.

In an embodiment of the present invention, the count value of the number of packet losses may also be updated by using a packet loss ratio:

$$PLEN = PLEN + \text{func}(C).$$

Where, PLEN indicates the count value of the number of packet losses and C indicates the packet loss ratio of video data. The packet loss ratio refers to a ratio of lost packets to packets that should be received in a data transmission process.

In an embodiment of the present invention, when the number of successively lost packets is not greater than the first packet threshold, optionally, determine whether the first packet loss of video data occurs, and, if the first packet loss occurs, set the count value of the number of packet losses to 1.

S44. Calculate video packet loss quality of video data.

Calculate video packet loss and distortion quality of the video data according to the number of effective packet loss times obtained through calculation in step S43.

In an embodiment of the present invention, the following formula is used to calculate video packet loss and distortion quality:

$$Q_{pkt\_lost} = (Q_{encoding} - MOS_{min}) \cdot \left(1 - \frac{1}{1 + \left(\frac{PLEN}{a_1}\right)^{b_1}}\right).$$

Where, PLEN indicates the number of effective packet loss times, ($Q_{encoding}$–$MOS_{min}$) indicates the maximum distortion degree for packet loss, $MOS_{min}$ indicates the lowest video quality, $Q_{encoding}$ indicates benchmark video quality, and $a_1$ and $b_1$ are constants.

It may be understood that the formula is just an example used to help understand the embodiment of the present invention rather than a limitation to the embodiment of the present invention.

S45. Perform calculation to obtain final video quality.

Perform calculation according to the benchmark video quality obtained in step S42 and the video packet loss and distortion quality obtained in step S44 to obtain final video quality of video data.

In an embodiment of the present invention, the following formula is used to calculate final video quality of video data:

$$Q_v = Q_{encoding} - Q_{pkt\_lost}.$$

Where, $Q_v$ indicates final video quality, $Q_{encoding}$ indicates benchmark video quality, and $Q_{pkt\_lost}$ indicates video packet loss and distortion quality.

An embodiment of the present invention further includes: determining whether the number of effective packet loss times obtained through calculation in step S43 is greater than a preset third threshold and, when the number of effective packet loss times is greater than the preset third threshold, directly determining a preset level to be the final video quality. A setting of the preset third threshold relates to statistics experience and the third threshold may be set according to subjective experience of a handler.

Compared with a video quality assessment method that uses only packet loss ratio, the video quality assessment method according to the embodiment of the present invention can accurately reflect a degree of damage of video frames, make assessment more accurate, and make algorithm complexity lower and can be easily used on various terminals.

Figure 9:
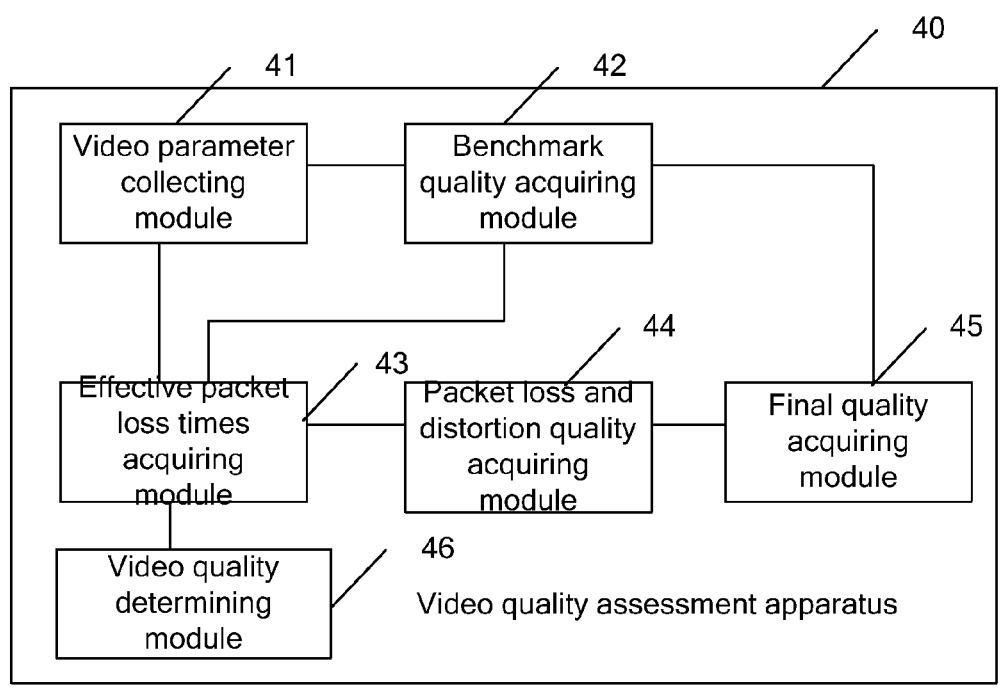
FIG. 9 is a schematic structural diagram of a video quality assessment apparatus according to another embodiment of the present invention.
Figure 10:
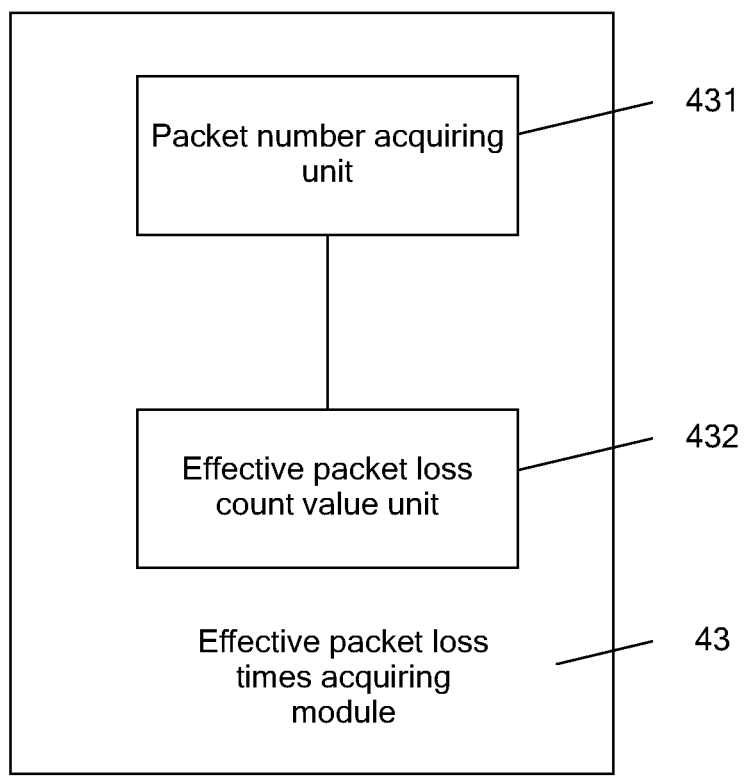
FIG. 10 is a schematic structural diagram of an effective packet loss times acquiring module according to the embodiment of the present invention shown in FIG. 9.

As shown in FIG. 9, an embodiment of the present invention provides a video quality assessment apparatus 40, including a video parameter collecting module 41, a benchmark video quality acquiring module 42, an effective packet loss times acquiring module 43, a packet loss and distortion quality acquiring module 44, and a final quality acquiring module 45.

The video parameter collecting module 41 is configured to acquire parameter information of video data, where the parameter information includes a bit rate, a frame rate, and packet information; the benchmark video quality acquiring module 42 is configured to perform calculation according to the bit rate or the frame rate acquired by the video parameter collecting module 41 to obtain benchmark video quality of the video data; the effective packet loss times acquiring module 43 is configured to calculate the number of correctly received packets between two successive packet losses according to the packet information acquired by the video parameter collecting module 41, and calculate the number of effective packet loss times according to the number of received packets and a second packet threshold; the packet loss and distortion quality acquiring module 44 is configured to perform calculation according to the number of effective packet loss times acquired by the effective packet loss times acquiring module 43 to obtain video packet loss and distortion quality of the video data; and the final quality acquiring module 45 is configured to perform calculation according to the benchmark video quality obtained by the benchmark video quality acquiring module 42 and the video packet loss and distortion quality obtained by the packet loss and distortion acquiring module 44 to obtain final video quality.

The video quality assessment apparatus 40 according to the embodiment of the present invention can accurately reflect a degree of damage of video frames, make assessment more accurate, and make algorithm complexity lower and can be easily used on various terminals.

In an embodiment of the present invention, the parameter information to be acquired by the video parameter collecting module 41 further includes at least one of a coding type, video resolution, an IP packet size, and video content information.

In an embodiment of the present invention, the packet information includes at least one of RTP packet information and TS packet information.

In an embodiment of the present invention, the effective packet loss times acquiring module 43 includes: a packet number acquiring unit 431 configured to calculate the number of correctly received packets between two successive packet losses according to the packet information; and an effective packet loss times count value unit 432 configured to, when the number of correctly received packets is greater than the second packet threshold, add 1 to a count value of the number of packet losses, and when the number of correctly received packets is not greater than the second packet threshold, update the count value of the number of packet losses according to the number of correctly received packets and the second packet threshold.

Repeat the foregoing steps until the to-be-assessed video data is processed completely, where the count value of the number of packet losses is the number of effective packet loss times.

In an embodiment of the present invention, the second packet threshold is set according to the bit rate or frame rate.

In an embodiment of the present invention, the effective packet loss times count value unit 432 is further configured to calculate the number of successively lost packets according to the packet information, and update the count value of the number of packet losses according to the number of successively lost packets and the first packet threshold.

In an embodiment of the present invention, the effective packet loss times count value unit 432 is further configured to: when the number of successively lost packets is greater than the first packet threshold, update the count value of the number of packet losses according to the number of successively lost packets and the first packet threshold; and when the number of successively lost packets is not greater than the first packet threshold, update the count value of the number of packet losses according to the number of successively lost packets.

In an embodiment of the present invention, the video quality assessment apparatus 40 further includes a video quality determining module 46. When the number of effective packet loss times of the video data is greater than a preset third threshold, directly determine a preset level to be the final video quality, where the number of effective packet loss times is obtained by the effective packet loss times acquiring module 43. A setting of the preset third threshold relates to statistics experience and the third threshold may be set according to subjective experience of a handler.

The video quality assessment apparatus 40 according to the embodiment of the present invention can accurately reflect a degree of damage of video frames, make assessment more accurate, and make algorithm complexity lower and can be easily used on various terminals.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The software product is stored in a storage medium, and includes several instructions for instructing a computer device (which may be a personal computer, a server, or a network device) to perform all or a part of the steps of the methods described in the embodiments of the present invention. The foregoing storage medium includes: any medium that can store program code, such as a universal serial bus (USB) flash drive, a removable hard disk, a read-only memory (ROM), a random access memory (RAM), a magnetic disk, or an optical disc.

The foregoing descriptions are merely exemplary implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A video quality assessment method, comprising:
acquiring parameter information of video data, wherein the parameter information comprises a bit rate, a frame rate, and packet information;
performing a calculation, according to the bit rate or frame rate, to obtain benchmark video quality of the video data;
calculating a number of successively lost packets according to the packet information, and calculating a number of effective packet loss times according to the number of successively lost packets and a first packet threshold;
performing a calculation according to the number of effective packet loss times to obtain video packet loss and distortion quality of the video data; and performing a calculation according to the benchmark video quality and the video packet loss and distortion quality to obtain final video quality.

2. The video quality assessment method according to claim 1, wherein calculating a number of effective packet loss times according to the number of successively lost packets and the first packet threshold comprises updating a count value of the number of packet losses according to the number of successively lost packets and the first packet threshold when the number of successively lost packets is greater than the first packet threshold.

3. The video quality assessment method according to claim 2, wherein the method further comprises updating the count value of the number of packet losses according to the number of successively lost packets when the number of successively lost packets is not greater than the first packet threshold.

4. The video quality assessment method according to claim 3, wherein updating the number of effective packet loss times according to the number of successively lost packets comprises:
calculating a number of correctly received packets between two packet losses according to the packet information;
adding one to the count value of the number of packet losses when the number of successively lost packets is not greater than a second packet threshold and the number of correctly received packets is greater than the second packet threshold; and
updating the count value of the number of packet losses according to the number of correctly received packets and the second packet threshold when the number of correctly received packets is not greater than the second packet threshold.

5. The video quality assessment method according to claim 3, wherein updating the count value of the number of packet losses according to the number of successively lost packets further comprises:
calculating the number of correctly received packets between two packet losses according to the packet information;
updating the count value of the number of packet losses according to the number of successively lost packets and the second packet threshold when the number of successively lost packets is greater than a second packet threshold and the number of correctly received packets is greater than the second packet threshold; and
updating the count value of the number of packet losses according to the number of successively lost packets, the number of correctly received packets, and the second packet threshold when the number of correctly received packets is not greater than the second packet threshold.

6. The video quality assessment method according to claim 1, wherein the first packet threshold is set according to the bit rate or the frame rate.

7. A video quality assessment apparatus, comprising:
a non-transitory computer-readable medium having instructions stored thereon; and
a computer processor coupled to the non-transitory computer-readable medium and configured to execute the instructions to:
acquire parameter information of video data, wherein the parameter information comprises a bit rate, a frame rate, and packet information;
perform calculation according to the bit rate or the frame rate obtained by the acquiring module to obtain benchmark video quality of the video data;
calculate a number of successively lost packets according to the packet information, and calculate a number of effective packet loss times according to the number of successively lost packets and a first packet threshold;
perform calculation according to the number of effective packet loss times obtained by the effective packet loss times generating module to obtain video packet loss and distortion quality of the video data; and
perform calculation according to the benchmark video quality obtained by the benchmark quality generating module and the video packet loss and distortion quality obtained by the packet loss and distortion quality generating module to obtain final video quality.

8. The video quality assessment apparatus according to claim 7, wherein the computer processor is configured to execute the instructions to:
determine whether a number of successively lost packets is greater than the first packet threshold; and
update a count value of the number of packet losses according to the number of successively lost packets and the first packet threshold when the number of successively lost packets is greater than the first packet threshold.

9. The video quality assessment apparatus according to claim 8, wherein the computer processor is configured to execute the instructions to update the count value of the number of packet losses according to the number of successively lost packets when the number of successively lost packets is not greater than the first packet threshold.

10. The video quality assessment apparatus according to claim 9, wherein the computer processor is configured to execute the instructions to:
calculate a number of correctly received packets between two packet losses according to the packet information;
add one to the count value of the number of packet losses when the number of successively lost packets is not greater than a second packet threshold and the number of correctly received packets is greater than the second packet threshold; and
update the count value of the number of packet losses according to the number of correctly received packets and the second packet threshold when the number of correctly received packets is not greater than the second packet threshold.

11. The video quality assessment apparatus according to claim 9, wherein the computer processor is configured to execute the instructions to:
calculate the number of correctly received packets between two packet losses according to the packet information;
update the count value of the number of packet losses according to the number of successively lost packets and the second packet threshold when the number of successively lost packets is greater than a second packet threshold and the number of correctly received packets is greater than the second packet threshold; and
update the count value of the number of packet losses according to the number of successively lost packets, the number of correctly received packets, and the second packet threshold when the number of correctly received packets is not greater than the second packet threshold.

12. The video quality assessment apparatus according to claim 7, wherein the first packet threshold is set according to the bit rate or the frame rate.

13. The video quality assessment apparatus according to claim 7, wherein the computer processor is configured to execute the instructions to directly determine a preset level to be the final video quality when the number of effective packet loss times of the video data is greater than a preset third threshold.

14. A video quality assessment apparatus, comprising:
- a non-transitory computer-readable medium having instructions stored thereon; and
- a computer processor coupled to the non-transitory computer-readable medium and configured to execute the instructions to:
- acquire parameter information of video data, wherein the parameter information comprises a bit rate, a frame rate, and packet information;
- to perform calculation according to the bit rate or the frame rate obtained by the video parameter collecting module to obtain benchmark video quality of the video data;
- to calculate a number of correctly received packets between two successive packet losses according to the packet information, and calculate a number of effective packet loss times according to the number of correctly received packets and a second packet threshold;
- to perform calculation according to the number of effective packet loss times obtained by the effective packet loss times acquiring module to obtain video packet loss and distortion quality of the video data; and
- perform calculation according to the benchmark video quality and the video packet loss and distortion quality to obtain final video quality.

15. The video quality assessment apparatus according to claim 14, wherein the computer processor is configured to execute the instructions to:
- calculate the number of correctly received packets between two successive packet losses according to the packet information; and
- add one to a count value of the number of packet losses when the number of correctly received packets is greater than the second packet threshold, and update the count value of the number of packet losses according to the number of correctly received packets and the second packet threshold when the number of correctly received packets is not greater than the second packet threshold.

16. The video quality assessment apparatus according to claim 15, wherein updating the count value of the number of packet losses according to the number of successively lost packets and the first packet threshold comprises:
- updating the count value of the number of packet losses according to the number of successively lost packets and the first packet threshold when the number of successively lost packets is greater than the first packet threshold; and
- updating the count value of the number of packet losses according to the number of successively lost packets when the number of successively lost packets is not greater than the first packet threshold.

17. The video quality assessment apparatus according to claim 14, wherein the computer processor is configured to execute the instructions to calculate the number of successively lost packets according to the packet information, and update the count value of the number of packet losses according to the number of successively lost packets and a first packet threshold.

18. The video quality assessment apparatus according to claim 14, wherein the second packet threshold is set according to the bit rate or frame rate.

19. The video quality assessment apparatus according to claim 14, wherein the computer processor is configured to execute the instructions to directly determine a preset level to be the final video quality when the number of effective packet loss times of the video data is greater than a preset third threshold.

* * * * *